Aug. 7, 1923.
F. C. PIERS
BURNER ATTACHMENT
Filed June 10, 1921
1,463,837
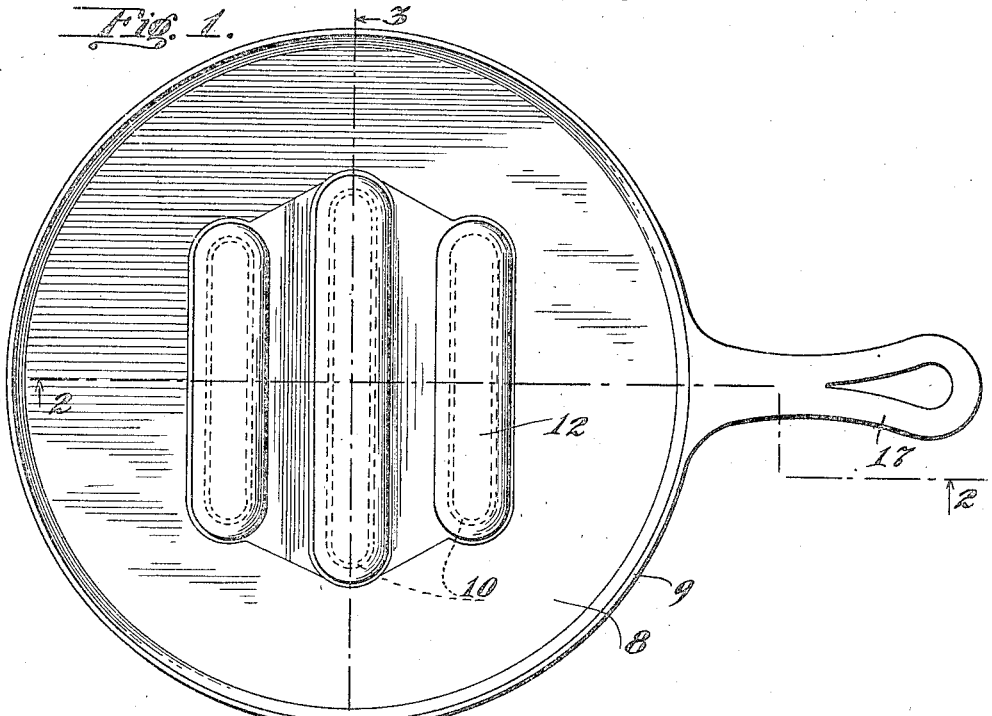
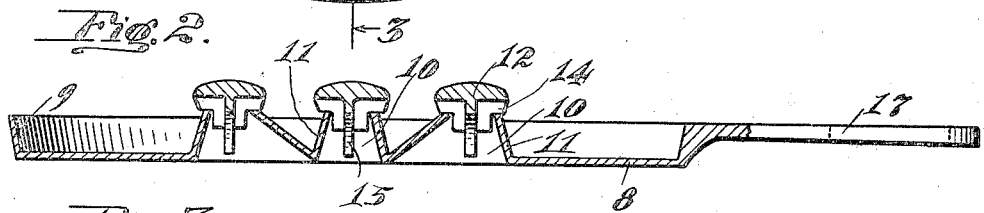
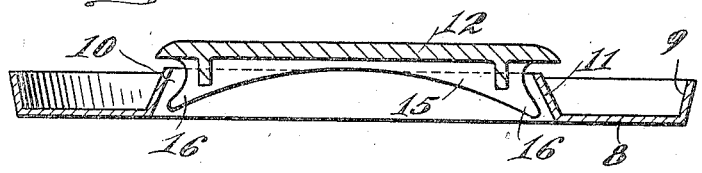
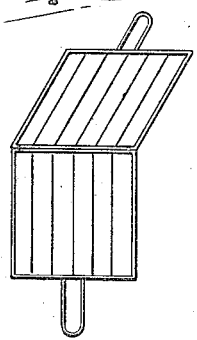
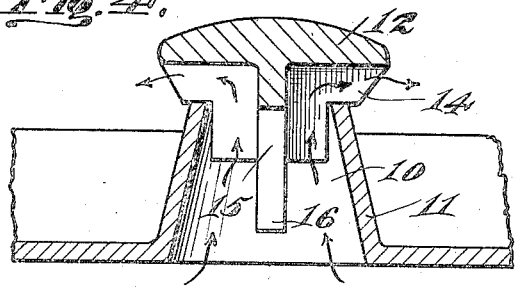
INVENTOR
Frank C. Piers;
By
Attorney.

Patented Aug. 7, 1923.

1,463,837

UNITED STATES PATENT OFFICE.

FRANK C. PIERS, OF LOS ANGELES, CALIFORNIA.

BURNER ATTACHMENT.

Application filed June 10, 1921. Serial No. 476,490.

*To all whom it may concern:*

Be it known that I, FRANK C. PIERS, a citizen of the United States, residing at Los Angeles, in the county of Los Angeles and State of California, have invented new and useful Improvements in a Burner Attachment, of which the following is a specification.

This invention relates to attachment for gas burners.

An object of the invention is to provide a metal plate having baffled apertures, adapted to be placed over a gas burner in cooking and heating stoves so as to multiply the heating and cooking radius and distribute the heat evenly over the increased radius; the apertures allowing burning gases to pass upward therethrough and come in contact with the baffles which become highly heated and thereby tend to improve combustion as well as to deflect heated air and products of combustion laterally across the upper surface of the device to give an intensely hot heating and cooking area of greater radius than is ordinarily obtained.

Another object is to provide a device of the above character which may be placed over a burner of any type of gas stove to increase the capacity and efficiently thereof.

Another object is to provide a device of the above character that is adapted to retain a small quantity of water distributed over the upper surface thereof, so that when a broiler containing meat or other food to be broiled is held over the device the contents of the broiler is subject to an evenly distributed high heat, but the food does not come in contact with flames or hot metal surfaces; and the drippings of fat drop into the water to form a natural gravy and are thereby preserved and are prevented from falling upon the burner to become ignited by contact with the flame.

A further object is to provide a device of the character described that will prevent escape of unburned gases to the room; and will tend to reduce the odors incident to cooking as well as permitting of the efficient combustion of a greater amount of gas.

The invention is illustrated in the accompanying drawings, in which:

Figure 1 is a plan view of the device.

Figure 2 is a view in section as seen on the line 2—2 of Figure 1.

Figure 3 is a view in section as seen on the line 3—3 of Figure 1.

Figure 4 is an enlarged view of a part of the device as seen on the line 2—2.

Figure 5 is a view of a broiler adapted for use in conjunction with the device.

More specifically, 8 indicates a circular plate, preferably of cast metal, which is formed with an obliquely extending wall 9, encompassing the edge of the plate to form a pan and provide a means of retaining water as well as drips of grease that fall thereon. The diameter of the plate is preferably greater than that of the gas burner on which it is to be used and the plate is adapted to rest directly upon the grating usually provided over usual types of gas burners employed in cooking stoves; or directly upon the burner of heating stoves.

The plate 8 is formed with a plurality of elongated apertures 10, which may be arranged in any suitable manner, but are here shown as extending parallel to each other and transversely across the plate. These apertures are encompassed by obliquely extending walls 11, which are of the same height as the wall 9, and serve to prevent water and drippings from escaping through the apertures as well as serving to direct the flow of burning gas, heated air, and products of combustion which pass through the apertures.

Metal caps 12, of greater longitudinal and transverse dimensions than the apertures 10, are provided over these apertures and are formed with shoulders 14, spaced at intervals, the shoulders depending downward from the metal caps are adapted to rest upon the upper edges of the walls 11, so as to hold the caps a short distance above these walls to permit of the flow of gases between the upper edges of the walls and the caps. These caps are of sufficient thickness to retain a quantity of heat and are reinforced against heat stresses and warping by means of a rib 15, extending longitudinally along the lower surface thereof. This rib is formed with arcuate ends 16, which extend beyond the adjacent upper margins of the walls, so that they are prevented from falling out of position when the plate is tilted to one side, such as in the act of pouring off the fluid contents of the pan; but permitting removal from the pan. The undersides of the caps are preferably flat and extend from the rib 15 to a point beyond the outer faces of the walls 11, and serve as baffles to direct flames horizontally as they emit from the apertures. A handle 17, is provided on the pan and is here shown as formed integral therewith.

When the device is placed over a lighted gas burner, not shown, the flames and hot gases rising therefrom are deflected by the plate substantially equally in all directions and the heat of the flame is thereby distributed evenly throughout the plate. The products of combustion in rising from the flame, as well as the heated air also rising, in following the shortest path of escape pass upward through the apertures and impinging against the lower edge of the caps are deflected laterally outward above the upper surface of the plate. The direction of these gases is indicated by the arrows in Figure 4.

The heat absorbed by the caps causes them to heat to incandescence and when unconsumed gases such as carbon-monoxide escape from the burner the high temperature of these caps causes them to be reignited and a recombustion of these gases takes place around these caps. Due to this effect of these incandescent caps large quantities of gas may be efficiently consumed when desired. Inasmuch as the products of combustion which pass along the lower surface of the device tend to give up the majority of their heat to the device, and inasmuch as all gases rising through the apertures are deflected laterally across the upper face of the plate, it is obvious that practically all heat is concentrated in the area of the plate and utensil placed above the device receives the maximum of heat from flame.

The device is adapted to be employed for any form of cooking or heating because of its tendency to improve the efficiency of a burner and give an evenly distributed area of heat and is particularly adapted to broiling meats and the like.

For this purpose a wire broiler, such as that illustrated in Figure 5 may be employed and when placed over the device the contents of the broiler is subject to the hot gases emanating from beneath the caps as well as the heat radiated upward by the upper surface of the plate. The gases passing upward through the apertures are normally sufficient for this purpose and a small quantity of water may be placed upon the plate. This water generates steam which mingles with the hot gases and becomes superheated and acts as a heat distributor. By varying the quantity of water used the intensity of the heat may be modified. The steam also tends to purify the surrounding air as well as to reduce the odor of cooking by absorbing the gases escaping from the broiling food. All dripping of fat from the food will fall into the water and form a natural gravy and the usual waste is eliminated.

Whereas, I have shown and described specific embodiment of my invention, I do not limit myself thereto but may employ other embodiments covering within the scope of the appended claims, without departing from the spirit of the invention, and whereas I have illustrated and described the device as applied to gas burners it may be employed over coal fires and the like.

I claim:

1. A burner attachment comprising a flat plate having a peripheral wall, there being three elongated parallel apertures through the plate, the central aperture being directly across the center of the plate, the apertures being encompassed by inclined walls as high as the plate wall, metal caps of greater longitudinal and transverse dimensions than the apertures, shoulders extending downwardly from the caps and resting upon the aperture walls, ribs extending downwardly from the caps and having arcuate ends extending under the end walls to hold the caps from falling out when the plate is lifted.

2. A burner attachment comprising a plate having a peripheral wall, there being a series of elongated parallel apertures through the plate, the apertures being encompassed by upwardly extending walls, metal caps of greater longitudinal and transverse dimensions than the apertures, shoulders extending downwardly from the caps and resting upon the aperture walls, ribs extending downwardly from the caps and having arcuate ends extending under the end walls to hold the caps from falling out when the plate is lifted.

3. A burner attachment comprising a pan having a series of elongated apertures in the bottom thereof each of which apertures is encompassed by an upwardly extending wall, a metal cap extending over each of the apertures in spaced relation to the upper edges of the walls and projecting beyond the outer faces of the walls, and means on said caps for supporting them on said walls.

FRANK C. PIERS.